US012723556B1

(12) United States Patent
Kupratis et al.

(10) Patent No.: US 12,723,556 B1
(45) Date of Patent: Sep. 1, 2026

(54) SPLITTER ASSEMBLY FOR A GAS TURBINE ENGINE OF AN AIRCRAFT PROPULSION SYSTEM

(71) Applicant: RTX Corporation, Farmington, CT (US)

(72) Inventors: Daniel B. Kupratis, Wallingford, CT (US); Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/184,646

(22) Filed: Apr. 21, 2025

(51) Int. Cl.
*F02K 3/075* (2006.01)

(52) U.S. Cl.
CPC ........ *F02K 3/075* (2013.01); *F05D 2220/323* (2013.01); *F05D 2240/129* (2013.01); *F05D 2260/606* (2013.01)

(58) Field of Classification Search
CPC .. F02K 3/075; F02C 7/04; F02C 7/042; F02C 9/20; F02C 9/22; F02C 9/54; F01D 17/16
See application file for complete search history.

(56) References Cited

U.S. PATENT DOCUMENTS 4,080,785 A 3/1978 Koff
5,261,227 A * 11/1993 Giffin, III ............ F01D 17/162 60/226.3
9,850,822 B2 * 12/2017 Kupratis .................. F02C 3/10
11,802,490 B2 * 10/2023 Hall ........................ F01D 25/04
11,859,565 B2 1/2024 Keeler
2013/0052003 A1 * 2/2013 Rodriguez ........... F01D 17/162 415/208.2
2015/0252680 A1 * 9/2015 LeBlanc .................. F01D 7/00 415/146
2017/0276012 A1 * 9/2017 Chandler ............. F04D 29/563
2018/0142706 A1 * 5/2018 Bishop ................. F01D 17/162
2018/0223743 A1 * 8/2018 Yamamoto ................ F02C 9/34
2018/0223868 A1 * 8/2018 Vallino ..................... F16H 1/08
2020/0040759 A1 * 2/2020 Mielke .................... F01D 17/20
2020/0080441 A1 * 3/2020 Farrell .................... F01D 17/16
2023/0044195 A1 * 2/2023 Joly ...................... F01D 17/162
2025/0003375 A1 1/2025 Rose

* cited by examiner

*Primary Examiner* — Phutthiwat Wongwian
*Assistant Examiner* — Jacek Lisowski
(74) *Attorney, Agent, or Firm* — Getz Balich LLC

(57) ABSTRACT

A splitter assembly for a gas turbine engine of an aircraft propulsion system includes a housing, a splitter band, a plurality of cams, and a plurality of vanes. The splitter band includes a plurality of segments. The plurality of segments are arranged circumferentially about the engine axis within the housing. Each of the plurality of segments is translatable within the housing between an extended position and a retracted position. Each of the plurality of cams contacts at least one of the plurality of segments. Each of the plurality of cams is pivotable about a respective pivot axis. The plurality of cams are configured to effect translation of the plurality of segments by pivoting about the pivot axis. The plurality of vanes are arranged circumferentially about an engine axis. Each of the plurality of vanes is pivotably mounted to and pivotable with a respective one of the plurality of cams.

20 Claims, 5 Drawing Sheets

SPLITTER ASSEMBLY FOR A GAS TURBINE ENGINE OF AN AIRCRAFT PROPULSION SYSTEM

BACKGROUND

1. Technical Field

This disclosure relates generally to aircraft propulsion systems and, more particularly, to a splitter assembly for a gas turbine engine.

2. Background Information

Various types and configurations of gas turbine engines for aircraft propulsion systems are known in the art, including those with splitter assemblies for separating inlet air flow into a core flow path and a bypass flow path. While these known aircraft propulsion systems may be suitable for their intended purposes, there is always room in the art for improvement.

SUMMARY

According to an aspect of the present disclosure, a splitter assembly for a gas turbine engine of an aircraft propulsion system includes a splitter structure, a splitter band, an actuation system, and a plurality of variable inlet guide vanes. The splitter structure includes an inner structure member, an outer structure member, and a splitter housing. The inner structure member, the outer structure member, and the splitter housing extend circumferentially about an engine axis. The outer structure member is disposed radially outward of the inner structure member. The splitter housing is disposed between the inner structure member and the outer structure member at an upstream end of the splitter structure. The splitter band includes a plurality of band segments. The plurality of band segments are arranged circumferentially about the engine axis within the splitter housing. Each of the plurality of band segments is translatable within the splitter housing between an extended position and a retracted position. The extended position is radially outward of the retracted position. The actuation system includes a plurality of first cams disposed within the splitter housing. Each of the plurality of first cams contacts at least one of the plurality of band segments. Each of the plurality of first cams is pivotable about a respective first pivot axis. The plurality of first cams are configured to effect translation of the plurality of band segments between the extended position and the retracted position by pivoting about the first pivot axis. The plurality of variable inlet guide vanes are disposed radially inward of the inner structure member. The plurality of variable inlet guide vanes are arranged circumferentially about the engine axis. Each of the plurality of variable inlet guide vanes is pivotably mounted to and pivotable with a respective one of the plurality of first cams.

In any of the aspects or embodiments described above and herein, each of the plurality of band segments may be translatable within the splitter housing along a translation axis, and the translation axis extends radially outward from the engine axis in a downstream to upstream direction.

In any of the aspects or embodiments described above and herein, the plurality of band segments in the retracted position may be disposed within the splitter housing and the plurality of band segments in the extended position are disposed at least partially outside of the splitter housing.

In any of the aspects or embodiments described above and herein, each of the plurality of variable inlet guide vanes may be configured to pivot about the first pivot axis in a closing direction as the plurality of band segments translate from the extended position to the retracted position.

In any of the aspects or embodiments described above and herein, the plurality of band segments may form a plurality of circumferential gaps through the splitter band, and each of the circumferential gaps may be formed between a circumferentially-adjacent pair of the plurality of band segments.

In any of the aspects or embodiments described above and herein, the actuation system may further include a plurality of second cams, a linkage assembly, and a synchronization ring, each of the plurality of second cams may be pivotable about a respective second pivot axis, each of the plurality of second cams may be operably coupled between the synchronization ring and a respective one of the plurality of first cams, and the synchronization ring may extend circumferentially about the engine axis.

In any of the aspects or embodiments described above and herein, the actuation system may further include an actuator operably coupled with the synchronization ring, and the actuator may be configured to rotate the synchronization ring about the engine axis.

In any of the aspects or embodiments described above and herein, the splitter assembly may further include a controller connected in signal communication with the actuator, the controller may include a processor connected in signal communication with a non-transitory memory storing instructions which, when executed by the processor, may cause the processor to control the actuator, in a first operating condition of the gas turbine engine, to rotate the synchronization ring in a first direction to translate the plurality of band segments to the extended position with the actuation system and control the actuator, in a second operating condition of the gas turbine engine, to rotate the synchronization ring in a second direction to translate the plurality of band segments to the retracted position with the actuation system.

In any of the aspects or embodiments described above and herein, each of the plurality of band segments may include an elastically deformable material body.

According to another aspect of the present disclosure, a gas turbine engine for an aircraft propulsion system includes an engine core, a bypass flow path, and a splitter assembly. The engine core extends along an engine axis of the gas turbine engine. The engine core includes a compressor section, a combustor section, and a turbine section. The engine core forms a core flow path extending through the compressor section, the combustor section, and the turbine section. The bypass flow path is disposed radially outward of the engine core. The splitter assembly is disposed radially between and forms the core flow path and the bypass flow path. The splitter assembly includes a splitter structure, a splitter band, a plurality of first cams, and a plurality of variable inlet guide vanes. The splitter structure includes an inner structure member, an outer structure member, and a splitter housing. The inner structure member, the outer structure member, and the splitter housing extend circumferentially about an engine axis. The inner structure member forms the core flow path. The outer structure member forms the bypass flow path. The splitter housing is disposed between the inner structure member and the outer structure member at an upstream end of the splitter structure. The splitter band includes a plurality of band segments. The plurality of band segments are arranged circumferentially about the engine axis within the splitter housing. Each of the plurality of band segments is translatable within the splitter housing between an extended position and a retracted position. The plurality of band segments in the extended position extends a least partially outside of the splitter structure at the upstream end. The plurality of first cams is disposed within the splitter housing. Each of the plurality of first cams contacts at least one of the plurality of band segments. Each of the plurality of first cams is pivotable about a respective first pivot axis. The plurality of first cams is configured to effect translation of the plurality of band segments between the extended position and the retracted position by pivoting about the first pivot axis. The plurality of variable inlet guide vanes are disposed within the core flow path. The plurality of variable inlet guide vanes are arranged circumferentially about the engine axis. Each of the plurality of variable inlet guide vanes is pivotably mounted to and pivotable with a respective one of the plurality of first cams.

In any of the aspects or embodiments described above and herein, the inner structure member and the outer structure member may form a splitter cavity radially between the inner structure member and the outer structure member, and a portion of the splitter housing may be disposed within the splitter cavity.

In any of the aspects or embodiments described above and herein, the plurality of band segments may form a plurality of circumferential gaps through the splitter band, and each of the circumferential gaps may be formed between a circumferentially-adjacent pair of the plurality of band segments.

In any of the aspects or embodiments described above and herein, the plurality of circumferential gaps may form an air flow path through the splitter band and the splitter housing to the splitter cavity.

In any of the aspects or embodiments described above and herein, the splitter assembly may further an actuation system including the plurality of first cams and further including a plurality of second cams, a linkage assembly, and a synchronization ring, each of the plurality of second cams may be pivotable about a respective second pivot axis, each of the plurality of second cams may be operably coupled between the synchronization ring and a respective one of the plurality of first cams, and the synchronization ring may extend circumferentially about the engine axis.

In any of the aspects or embodiments described above and herein, the plurality of second cams may be configured to obstruct the air flow path with the plurality of band segments in the retracted position.

In any of the aspects or embodiments described above and herein, the inner structure member may include a first leading edge, the outer structure member may include a second leading edge, and the upstream end may be disposed axially forward of the first leading edge and the second leading edge.

In any of the aspects or embodiments described above and herein, the plurality of band segments in the extended position may be disposed radially outward of and axially upstream of the plurality of band segments in the retracted position.

According to another aspect of the present disclosure, a method for operating a splitter assembly of a gas turbine engine for an aircraft propulsion system includes directing an air flow through a fan section and into a core flow path and a bypass flow path by rotating a bladed fan rotor. Directing the air flow into the core flow path includes directing the air flow through a plurality of variable inlet guide vanes. The method further includes separating the air flow into the core flow path and the bypass flow path with the splitter assembly and operating the splitter assembly to position a splitter band of the splitter assembly. The splitter band includes a plurality of band segments arranged circumferentially about an engine axis of the gas turbine engine. Operating the splitter assembly to position the splitter band includes translating each of the plurality of band segments along a translation axis between an extended position and a retracted position. The plurality of band segments in the extended position form a leading edge of the splitter assembly. The plurality of band segments in the retracted position are disposed radially inward and axially downstream of the plurality of band segments in the extended position. The method further includes controlling each of the plurality of variable guide vanes, with the splitter assembly, to pivot about a pivot axis as each of the plurality of band segments translates along the translation axis.

In any of the aspects or embodiments described above and herein, the method may further include directing air flow through the splitter band with the plurality of band segments in the extended position.

In any of the aspects or embodiments described above and herein, each of the plurality of variable guide vanes may pivot about the pivot axis in a closing direction as the plurality of band segments translate along the translation axis from the extended position to the retracted position.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
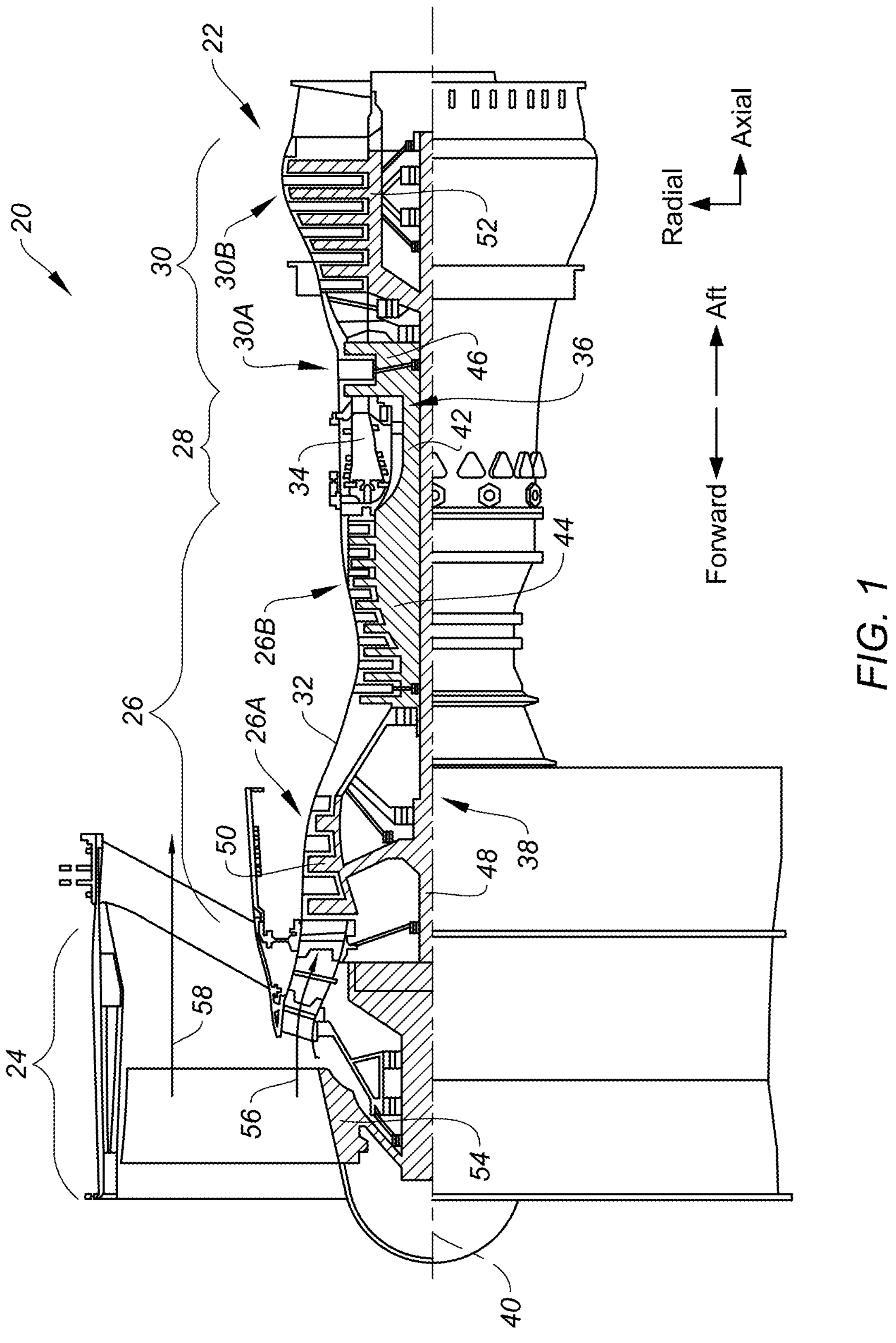
FIG. 1 schematically illustrates a cutaway, side view of an aircraft propulsion system including a gas turbine engine, in accordance with one or more embodiments of the present disclosure.

FIG. 1 schematically illustrates a cutaway, side view of a propulsion system 20 for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV; e.g., a drone).

Figure 2:
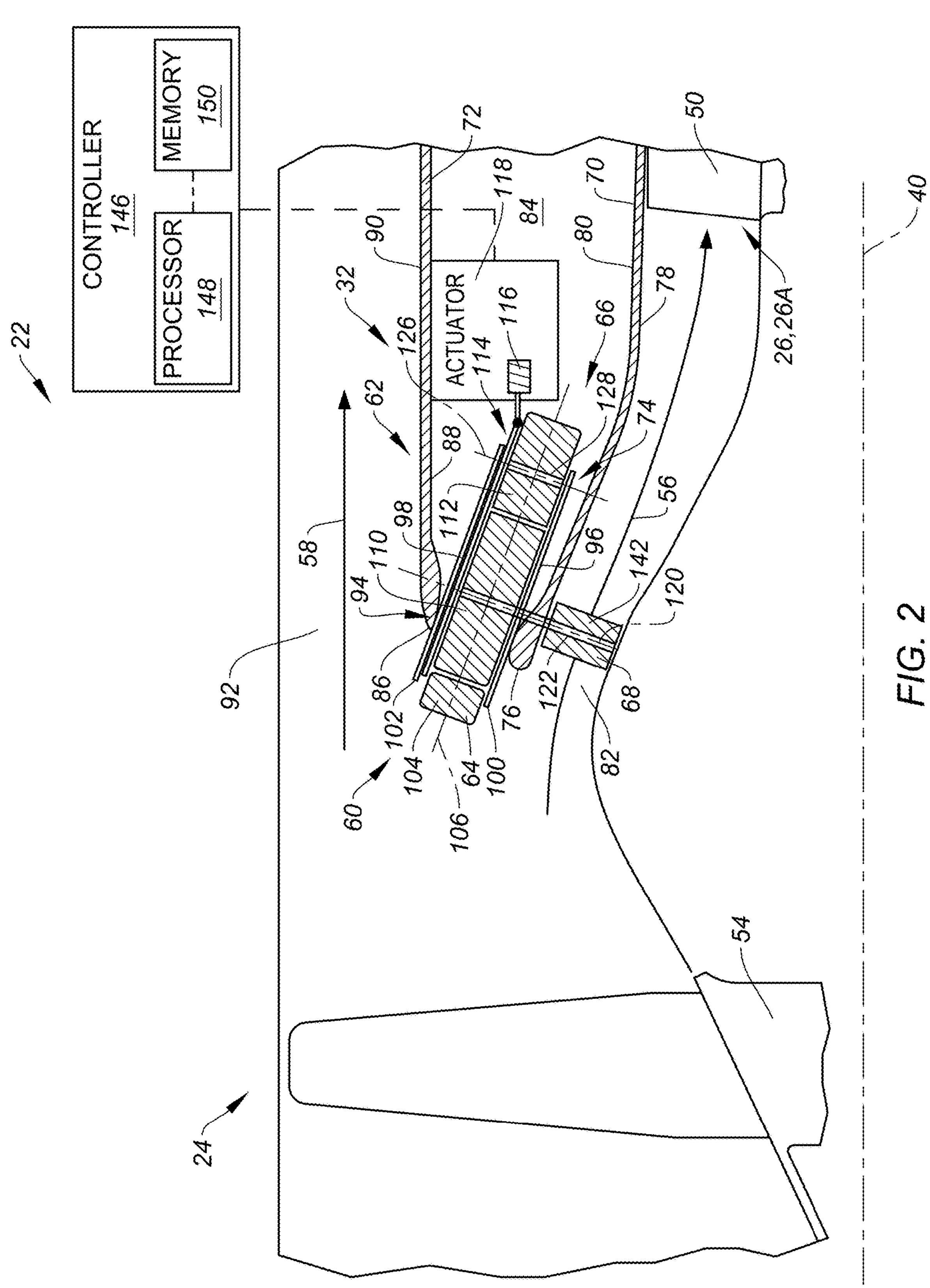
FIG. 2 schematically illustrates a cutaway, side view of a portion of the gas turbine engine and a splitter assembly including a splitter band and variable inlet guide vanes in respective first positions, in accordance with one or more embodiments of the present disclosure.

The propulsion system 20 of FIG. 1 includes a gas turbine engine 22. The gas turbine engine 22 of FIG. 2 is configured as a multi-spool turbofan gas turbine engine. However, while the following description and accompanying drawings may refer to the turbofan gas turbine engine of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, or a propfan (e.g., an open rotor) gas turbine engine.

The gas turbine engine 22 of FIG. 1 includes a fan section 24, a compressor section 26, a combustor section 28, a turbine section 30, and an engine static structure 32. The compressor section 26, the combustor section 28, and the turbine section 30 may collectively be referred to as an "engine core" of the gas turbine engine 22. The compressor section 26 includes a low-pressure compressor (LPC) 26A and a high-pressure compressor (HPC) 26B. The combustor section 28 includes a combustor 34 (e.g., an annular combustor). The turbine section 30 includes a high-pressure turbine (HPT) 30A and a low-pressure turbine (LPT) 30B.

Components of the fan section 24, the compressor section 26, and the turbine section 30 form a first rotational assembly 36 (e.g., a high-pressure spool) and a second rotational assembly 38 (e.g., a low-pressure spool) of the gas turbine engine 22. The first rotational assembly 36 and the second rotational assembly 38 are mounted for rotation about an engine axis 40 (e.g., a rotational axis, an axial centerline) of the gas turbine engine 22 relative to the engine static structure 32.

The first rotational assembly 36 includes a first shaft 42, a bladed first compressor rotor 44 for the high-pressure compressor 26B, and a bladed first turbine rotor 46 for the high-pressure turbine 30A. The first shaft 42 interconnects the bladed first compressor rotor 44 and the bladed first turbine rotor 46.

The second rotational assembly 38 includes a second shaft 48, a bladed second compressor rotor 50 for the low-pressure compressor 26A, a bladed second turbine rotor 52 for the low-pressure turbine 30B, and a bladed fan rotor 54 for the fan section 24. The second shaft 48 of FIG. 2 interconnects the bladed second compressor rotor 50 and the bladed second turbine rotor 52. The second shaft 48 may additionally interconnect the bladed second turbine rotor 52 with the bladed fan rotor 54. Alternatively, the bladed fan rotor 54 may be operably coupled to the second shaft 48 by a gear train (e.g., a reduction gear assembly) configured to drive rotation of the bladed fan rotor 54 at a different rotational speed than the second shaft 48. The first shaft 42 and the second shaft 48 may be concentric and configured to rotate about the engine axis 40. The present disclosure, however, is not limited to concentric configurations of the first shaft 42 and the second shaft 48.

The engine static structure 32 may include one or more engine cases, cowlings, bearing assemblies, and/or other non-rotating structures configured to house and/or support (e.g., rotationally support) components of the gas turbine engine 22 sections 24, 26, 28, 30.

In operation of the gas turbine engine 22 of FIG. 2, ambient air is directed through the fan section 24 and into a core flow path 56 (e.g., an annular flow path) and a bypass flow path 58 (e.g., an annular flow path) facilitated by rotation of the bladed fan rotor 54. The air flow is directed into the core flow path 56 at an annular core inlet duct upstream of the low-pressure compressor 26A. Airflow along the core flow path 56 is compressed by the low-pressure compressor 26A and the high-pressure compressor 26B, mixed and burned with fuel in the combustor 34, and then directed through the high-pressure turbine 30A and the low-pressure turbine 30B. The bladed first turbine rotor 46 and the bladed second turbine rotor 52 rotationally drive the first rotational assembly 36 and the second rotational assembly 38, respectively, in response to the combustion gas flow through the high-pressure turbine 30A and the low-pressure turbine 30B. The bypass flow path 58 may be disposed outside the engine static structure 32. For example, the engine static structure 32 and an outer aircraft propulsion system housing (e.g., a nacelle) may form an annular bypass duct radially therebetween, and airflow may be directed through the annular bypass duct along the bypass flow path 58.

Figure 3:
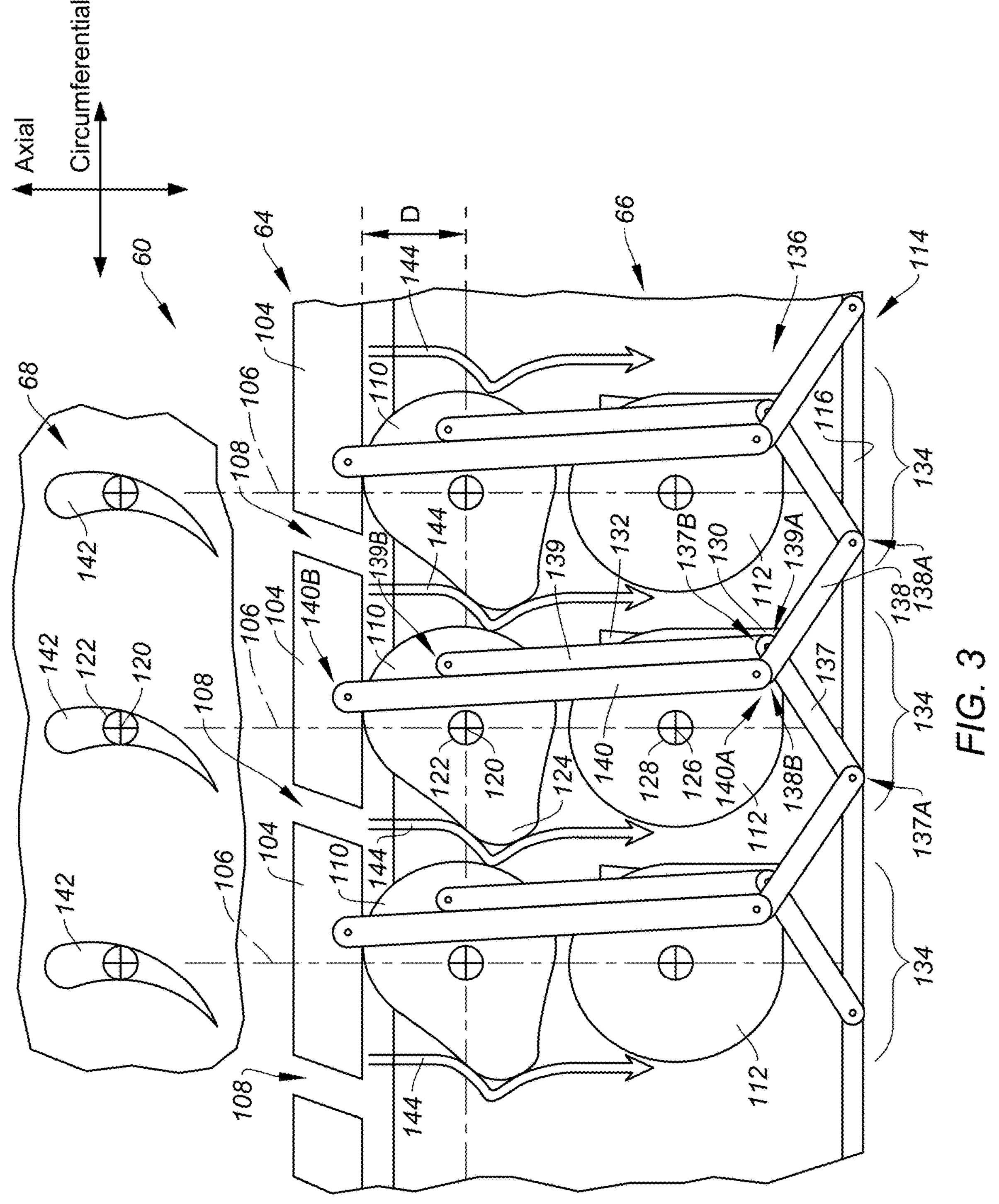
FIG. 3 schematically illustrates a plan view of the splitter assembly of FIG. 2, in accordance with one or more embodiments of the present disclosure.
Figure 4:
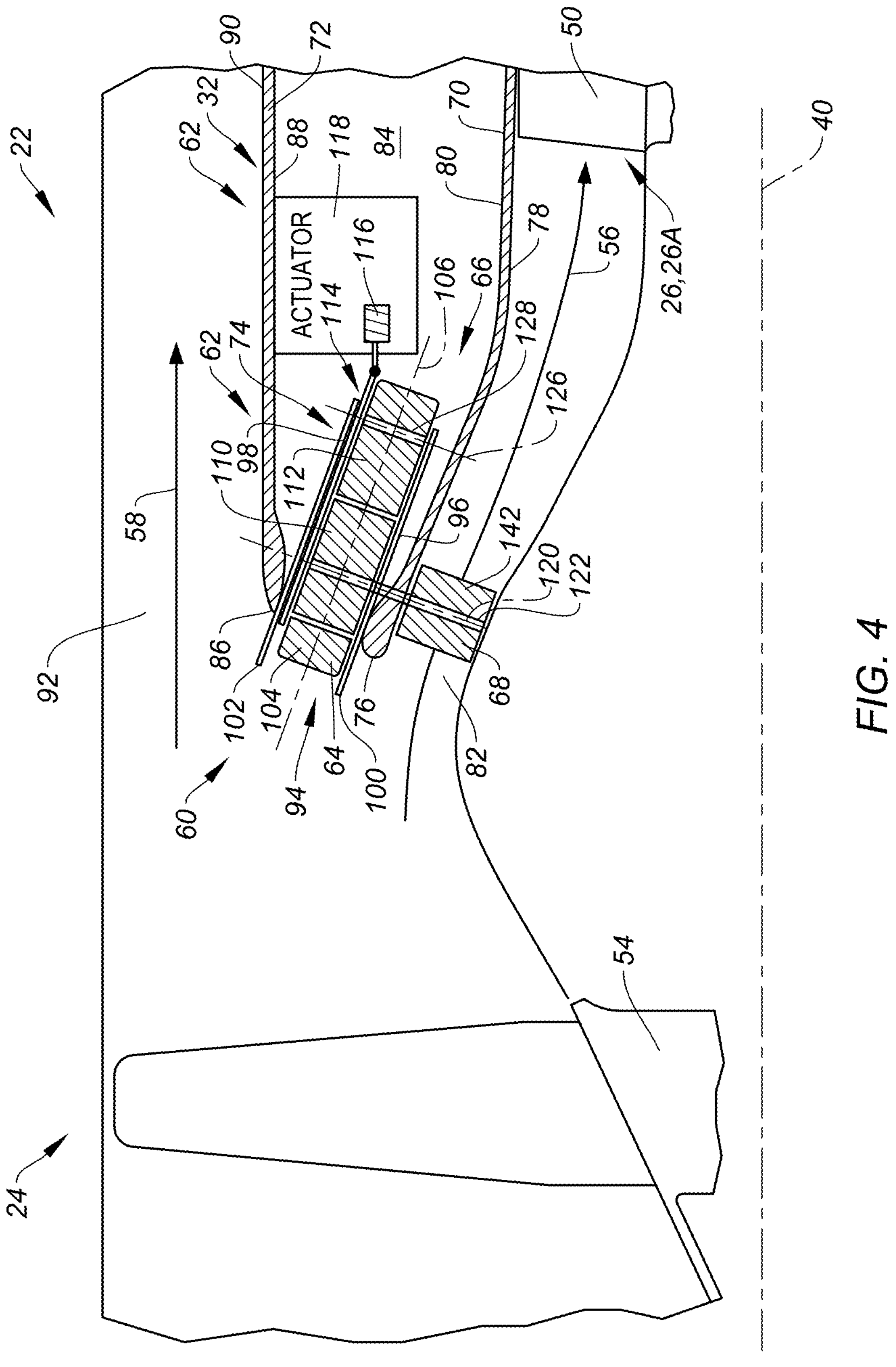
FIG. 4 schematically illustrates a cutaway, side view of the portion of the gas turbine engine and the splitter assembly with the splitter band and the variable inlet guide vanes in respective second positions, in accordance with one or more embodiments of the present disclosure.
Figure 5:
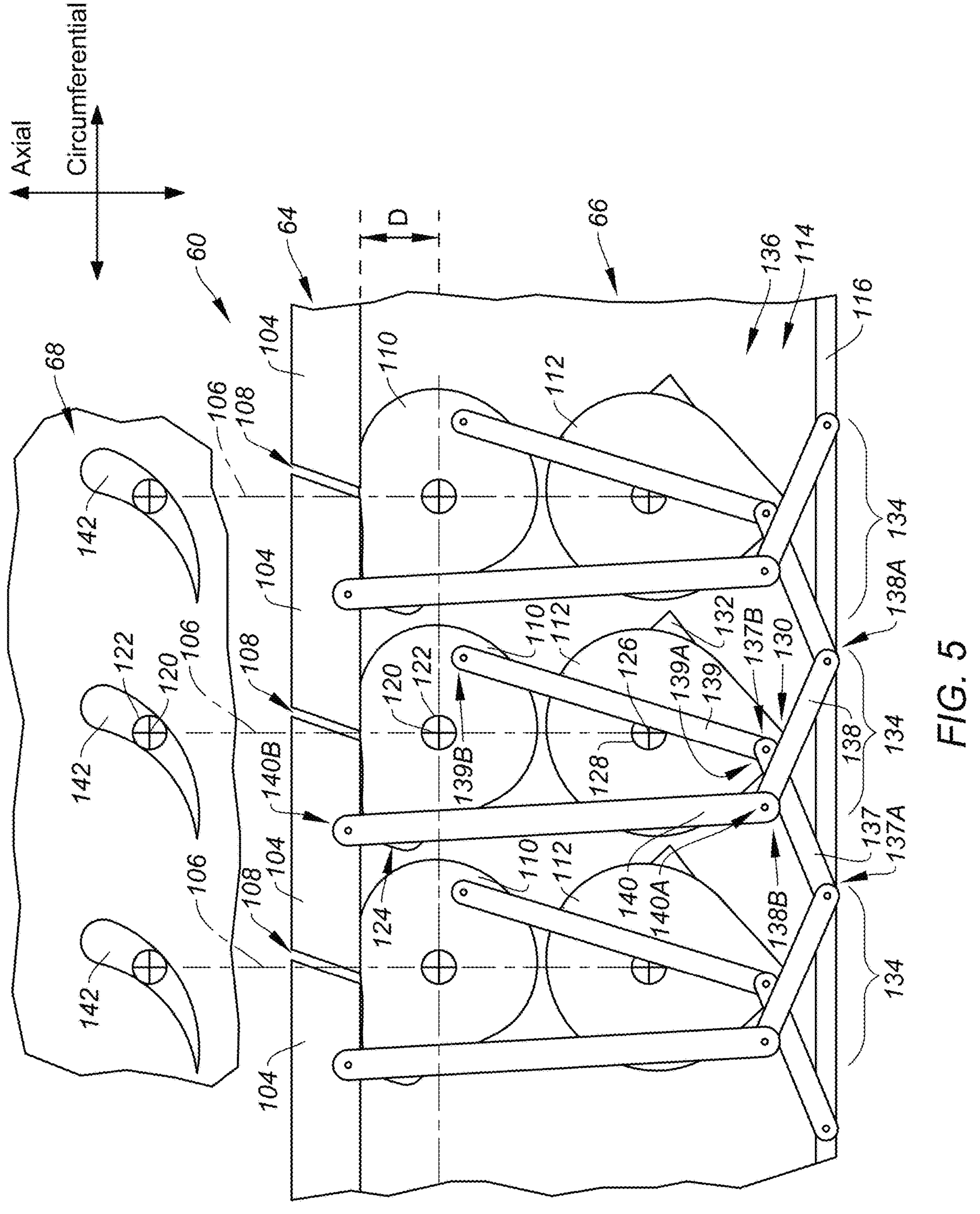
FIG. 5 schematically illustrates a plan view of the splitter assembly of FIG. 4, in accordance with one or more embodiments of the present disclosure.

Referring to FIGS. 2-5, the gas turbine engine 22 further includes a core-bypass splitter assembly 60. The splitter assembly 60 of FIGS. 2-5 includes a splitter structure 62, a splitter band 64, an actuation system 66, and a plurality of variable inlet guide vanes 68. FIGS. 2 and 4 schematically illustrate cutaway, side views of the splitter assembly 60 for different positions of the splitter band 64 and the variable inlet guide vanes 68. FIGS. 3 and 5 schematically illustrate plan views of portions of the splitter assembly 60 for the different respective positions shown in FIGS. 2 and 4. The variable inlet guide vanes 68 are of FIGS. 3 and 5 are shown displaced from the actuation system 66 for clarity.

The splitter structure 62 includes an annular portion of the engine static structure 32 radially between and forming the core flow path 56 and the bypass flow path 58 downstream of the bladed fan rotor 54. The splitter structure 62 includes a radially inner structure member 70, a radially outer structure member 72, and a splitter housing 74.

The inner structure member 70 extends circumferentially about (e.g., completely around) the engine axis 40. The inner structure member 70 includes a leading edge 76. The inner structure member 70 further includes a radially inner side 78 and a radially outer side 80 each extending downstream (e.g., aftward) from the leading edge 76. The inner structure member 70 forms an inlet 82 of the core flow path 56 at the leading edge 76. The inner side 78 forms a portion of the core flow path 56 (e.g., an outer radial boundary of the core flow path 56) at and downstream from the leading edge 76. For example, the inner side 78 may form the core flow path 56 from the inlet 82 to the compressor section 26 (e.g., the low-pressure compressor 26A). The outer side 80 forms an annular splitter cavity 84 (e.g., an inner radial boundary of the splitter cavity 84) radially between the inner structure member 70 and the outer structure member 72.

The outer structure member 72 extends circumferentially about (e.g., completely around) the engine axis 40. The outer structure member 72 is disposed radially outward of and spaced from the inner structure member 70. The outer structure member 72 includes a leading edge 86. The leading edge 86 is disposed downstream and/or aftward of the leading edge 76. The outer structure member 72 further includes a radially inner side 88 and a radially outer side 90 each extending downstream (e.g., aftward) from the leading edge 86. The outer structure member 72 forms an inlet 92 of the bypass flow path 58 at the leading edge 86. The inner side 88 further forms the annular splitter cavity 84 (e.g., an outer radial boundary of the splitter cavity 84). The outer side 90 forms a portion of the bypass flow path 58 (e.g., an inner radial boundary of the bypass flow path 58) at and downstream from the leading edge 86. The inner structure member 70 and the outer structure member 72 form an annular gap 94 radially between the inner structure member 70 and the outer structure member 72 at (e.g., on, adjacent, or proximate) the leading edges 76, 86. The annular gap 94 forms an opening of the splitter cavity 84.

The splitter housing 74 includes an inner housing member 96 and an outer housing member 98. The inner housing member 96 and the outer housing member 98 extend circumferentially about (e.g., completely around) the engine axis 40. The inner housing member 96 and the outer housing member 98 form a conical, fixed structure of the splitter housing 74. The inner housing member 96 and the outer housing member 98 each extend through the annular gap 94 with portions of the housing members 96, 98 disposed within the splitter cavity 84 and portions of the housing members 96, 98 disposed outside the splitter cavity 84. The inner housing member 96 is mounted to, formed by, or otherwise disposed at (e.g., on, adjacent, or proximate) the inner structure member 70. The inner housing member 96 includes a leading edge 100 disposed upstream and/or axially forward of the leading edge 76. As shown in FIGS. 2 and 4, the leading edge 100 may additionally be disposed radially outward of the leading edge 76. Alternatively, in some embodiments, the leading edge 76 and leading edge 100 may be disposed at a common plane perpendicular to the engine axis 40. The outer housing member 98 is mounted to, formed by, or otherwise disposed at (e.g., on, adjacent, or proximate) the outer structure member 72. The outer housing member 98 is disposed radially outward of and spaced from the inner housing member 96. The outer housing member 98 includes a leading edge 102 disposed upstream and/or axially forward of the leading edge 86. As shown in FIGS. 2 and 4, the leading edge 102 may additionally be disposed radially outward of the leading edge 86. Alternatively, in some embodiments, the leading edge 86 and leading edge 102 may be disposed at a common plane perpendicular to the engine axis 40.

The annular splitter band 64 is disposed within the splitter housing 74 at (e.g., on, adjacent, or proximate) the leading edges 100, 102. The splitter band 64 is disposed radially between the inner housing member 96 and the outer housing member 98. The splitter band 64 extends circumferentially about (e.g., completely around) the engine axis 40. The splitter band 64 includes a plurality of discrete, circumferential band segments 104 arranged circumferentially within the splitter housing 74 to form the annular splitter band 64. In particular, the band segments 104 collectively form the annular splitter band 64 as a piecewise, non-continuous circumferential band about the engine axis 40. Each of the band segments 104 is a circular arc segment centered about the engine centerline 40. Each of the band segments 104 is translatable within the splitter housing 74 along a respective translation axis 106 (collectively translation axes 106). The translation axis 106 may include both axial and radial components relative to the engine axis 40. For example, the translation axis 106 may extend radially outward in an aft to forward axial direction. As shown in FIGS. 2 and 4, the inner housing member 96 and the outer housing member 98 may extend parallel to or substantially parallel to the translation axis 106.

Each of the band segments 104 may include an elastically deformable material forming all or a substantial portion of the respective band segment 104. This elastically deformable material body may be understood to be elastically deformable primarily in the circumferential direction such that each of the band segments 104 may be deformable between a larger diameter arc segment shape and a smaller diameter arc segment shape, for example, as the band segments 104 translate within the splitter housing 74 along the translation axes 106. The elastically deformable material, as used herein, may be understood to refer to an elastically deformable metal or metal alloy material such as, but not limited to, copper, brass, or another suitable high-ductility metal or metal alloy material. Moreover, the elastically deformable material may include combinations of different metals and/or metal alloys. It is contemplated, however, that the elastically deformable material may alternatively include non-metallic materials such as rubber, polymeric materials (e.g., plastics), or the like.

As shown in FIGS. 3 and 5, the band segments 104 form a plurality of circumferential gaps 108 with each of the circumferential gaps 108 formed between each circumferentially-adjacent pair of the band segments 104. The circumferential gaps 108 extend through the splitter band 64 along the translation axes 106. The band segments 104 are translatable along the translation axes 106 between an extended position (FIGS. 2 and 3), a retracted position (FIGS. 4 and 5), and a plurality of intermediate positions between the extended position and the retracted position. In the extended position, the splitter band 64 may be disposed at least partially outside of the splitter housing 74, for example, projecting axially and radially outward from the splitter housing 74. In the retracted position, the splitter band 64 may be disposed entirely within the splitter housing 74. In this retracted position, the splitter band 64 has a reduced circumferential diameter, relative to the engine axis 40, compared to the splitter band 64 in the extended position. This change in the splitter band 64 diameter in response to translation of the band segments 104 along the translation axes 106 correspondingly affects a circumferential size of each of the circumferential gaps 108. For example, as can be understood from FIGS. 3 and 5, as the band segments 104 translate from the retracted position to the extended position, a circumferential size of each of the circumferential gaps 108 increases. In the retracted position, the circumferential gaps 108 formed by the band segments 104 may be entirely or substantially closed.

The actuation system 66 includes a plurality of forward cams 110, a plurality of aft cams 112, a linkage assembly 114, a synchronization ring 116, and an actuator 118. The actuation system 66 may additionally include or be connected in communication with a controller 146.

The forward cams 110 are pivotably mounted within the splitter housing 74. The forward cams 110 may each be pivotably mounted to the inner housing member 96 and/or the outer housing 98 at a respective pivot axis 120 extending between the inner housing member 96 and the outer housing member 98. For example, each of the forward cams 110 may be pivotably mounted to the splitter housing 74 by a shaft 122 extending along the pivot axis 120. The forward cams 110 are disposed between and adjacent the splitter band 64 and the aft cams 112 along the translation axes 106. Each of the forward cams 110 is disposed circumferentially coincident with respective ones of the band segments 104 and the aft cams 112, relative to the engine axis 40. Each of the forward cams 110 abut or may otherwise be disposed in close proximity to one or more of the band segments 104 throughout the translational range of motion of the band segments 104. For example, as shown in FIGS. 3 and 5, each of the forward cams 110 abuts the one or more of the band segments 104 in the extended position (FIG. 3) and the retracted position (FIG. 5) of the splitter band 64. Each of the forward cams 110 is characterized by a cam profile having a protruding segment 124 which projects outward to a distal radial end of the respective forward cam 110 relative to its pivot axis 120.

The aft cams 112 are pivotably mounted within the splitter housing 74. The aft cams 112 may each be pivotably mounted to the inner housing member 96 and/or the outer housing 98 at a respective pivot axis 126 extending between the inner housing member 96 and the outer housing member 98. For example, each of the aft cams 112 may be pivotably mounted to the splitter housing 74 by a shaft 128 extending along the pivot axis 126. Each of the aft cams 112 is characterized by a cam profile having a protruding segment 130 which projects outward to a distal radial end of the respective aft cam 112 relative to its pivot axis 126. The aft cams 112 may each additionally include a sealing member 132 projecting radially outward from a surrounding perimeter of the respective aft cam 112 relative to its pivot axis 126.

The band segments 104, the forward cams 110, and the aft cams 112 form a plurality of actuating mechanical units 134 with each of the mechanical units 134 including one of the band segments 104, one of the forward cams 110, one of the aft cams 112, and one of the variable inlet guide vanes 68 mechanically interconnected together.

The linkage assembly 114 includes a plurality of linkages 136 interconnecting each of the mechanical units 134 with the synchronization ring 116. FIGS. 3 and 5 illustrate a non-limiting, exemplary configuration of the linkage assembly 114 for effecting actuation of the mechanical units 134. For each of the mechanical units 134, the linkages 136 of FIGS. 3 and 5 include a first linkage 137, a second linkage 138, a third linkage 139, and a fourth linkage 140. Each of the linkages 137-140 extends between and to a first end 137A-140A and a second end 137B-140B, respectively. The first linkage 137 is pivotably mounted to the synchronization ring 116 at the first end 137A. The first linkage 137 is pivotably mounted to the respective aft cam 112 and the third linkage 139 at the second end 137B. More specifically, the second end 137B is pivotably mounted to the respective aft cam 112 at the protruding segment 130 and to the third linkage 139 at the first end 139A. The second linkage 138 is pivotably mounted to the synchronization ring 116 at the first end 138A. The second linkage 138 is pivotably mounted to the fourth linkage 140 at the second end 138B. More specifically, the second end 138B is pivotably mounted to the fourth linkage 140 at the first end 140A. The third linkage 139 is pivotably mounted to the respective forward cam 110 at the second end 139B. The fourth linkage 140 is pivotably mounted to the respective band segment 104 at the second end 140B. Of course, the present disclosure is not limited to the foregoing exemplary configuration of the linkage assembly 114. The fourth linkage 140 pulls the respective band segment 104 against one or more of the forward cams 112 to facilitate secure retention of the band segment 104.

The synchronization ring 116 extends circumferentially about (e.g., completely around) the engine axis 40. The synchronization ring 116 of FIGS. 2 and 4 is disposed within the splitter cavity 84; however, it is contemplated that the synchronization ring 116 may alternatively be disposed outside of the splitter cavity 84. The actuator 118 is operably coupled with the synchronization ring 116 to effect rotation of the synchronization ring 116 about the engine axis 40. The actuator 118 may take various forms. For example, it can be provided in the form of a linear actuator, such as a piston and cylinder arrangement, configured to apply a tangential force to the synchronization ring 116 so as to rotate the synchronization ring 116 about the engine axis 40. The actuator 118 may be configured as an electromechanical actuator, a hydraulic actuator, a pneumatic actuator, or the like, and the present disclosure is not limited to any particular configuration of the actuator 118. The actuator 118 may be disposed within the splitter cavity 84. Alternatively, portions of the actuator 118 may be disposed outside of the splitter cavity 84.

The variable inlet guide vanes 68 are disposed within the core flow path 56 downstream of (e.g., and proximate) the inlet 82. The variable inlet guide vanes 68 are arranged and may be equispaced circumferentially about the engine axis 40 and radially inboard of the splitter structure 62 in an array (e.g., an annular array). Each of the variable inlet guide vanes 68 includes an airfoil body 142. This airfoil body 142 is pivotably mounted to the forward cam 110 of the respective mechanical unit 134 along the pivot axis 120 by the shaft 122. Accordingly, the airfoil body 142 is configured to pivot about the pivot axis 120 with the respective forward cam 110.

In operation of the splitter assembly 60, the rotation of the synchronization ring 116 (e.g., by the actuator 118) effects actuation of the linkages 136 and the mechanical units 134 to collectively position the splitter band 64 and the variable inlet guide vanes 68. The splitter band 64 is disposed at a distance D from the respective pivot axes 120 of the forward cams 110 along the translation axes 106. As previously discussed, the band segments 104 are translatable along the translation axes 106 between an extended position (FIGS. 2 and 3), a retracted position (FIGS. 4 and 5), and a plurality of intermediate positions between the extended position and the retracted position The distance D with the band segments 104 in their extended positions is greater than the distance D with the band segments 104 in their retracted positions. Pivoting of the first cams 110 in a first direction about the respective pivot axes 120 pushes the band segments 104 outward along the translation axes 106 to or toward the extended position, as shown in FIG. 3. Pivoting of the first cams 110 in a second direction about the respective pivot axes 120 causes the band segments 104 to move inward along the translation axes 106, pulled by the fourth linkage 140, to or toward the retracted position, as shown in FIG. 5. With the band segments 104 in their extended positions, the splitter assembly 60 (e.g., the splitter band 64) captures a greater volume of fan blade exit flow from the bladed fan rotor 54, thereby achieving a lower bypass ratio of bypass air flow along the bypass flow path 58 relative to core air flow along the core flow path 56. The circumferential gaps 108 and relative positions of the cams 110, 112 in this extended position also direct air flow 144 into the splitter cavity 84 through the splitter housing 74. This air flow 144 facilitates pressurization and purging of the splitter cavity 84. In contrast, with the band segments 104 in their retracted positions, the splitter assembly 60 (e.g., the splitter band 64) captures a lower volume of fan blade exit flow from the bladed fan rotor 54, thereby achieving a higher bypass ratio of bypass air flow along the bypass flow path 58 relative to core air flow along the core flow path 56. The closed or substantially closed circumferential gaps 108 and relative positions of the cams 110, 112 in this retracted position also restrict air flow 144 into the splitter cavity 84 through the splitter housing 74. For example, the sealing member 132 of each of the aft cams 112 may be disposed at (e.g., on, adjacent, or proximate) a circumferentially adjacent one of the aft cams 112 to further restrict the air flow 144 through the splitter housing 74. The variable inlet guide vanes 68 (e.g., the airfoil body 142) pivot with the respective forward cams 110 to change an angle at which air flow along the core flow path 56 impinges on the downstream compressor rotor (e.g., the bladed second compressor rotor 50). As can be understood from FIGS. 3 and 5, in the extended position of the band segments 104 (FIG. 3), the variable inlet guide vanes 68 may be oriented in an open or substantially open state. As the band segments 104 are moved from their extended positions to their retracted positions by operation of the actuation system 66, the variable inlet guide vanes 68 are pivoted from their open or substantially open state toward a closed state.

Referring to FIG. 2, the propulsion system 20 may include the controller 146. The controller 146 may be connected in signal communication with the actuator 118 and configured to control the actuator 118 to effect positioning of the band segments 104 and the variable inlet guide vanes 68 through operation of the actuation system 66. The controller 146 includes a processor 148 connected in signal communication with memory 150. The processor 148 may include any type of computing device, computational circuit, processor(s), central processing unit (CPU), graphics processing unit (GPU), computer, or the like capable of executing a series of instructions that are stored in the memory 150. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the controller 146 and its processor 148 to accomplish the same algorithmically and/or by coordination of propulsion system 20 components including, but not limited to, the actuator 118. The memory 150 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the controller 146. The controller 146 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the controller 146 and external electrical or electronic devices may be via a hardwire connection or via a wireless connection. A person of skill in the art will recognize that portions of the controller 146 may assume various forms (e.g., digital signal processor, analog device, etc.).

The controller 146 may form or otherwise be part of an engine control unit (ECU) for the propulsion system 20. The ECU may control operating parameters of the gas turbine engine 22 including, but not limited to, fuel flow, compressor bleed air, shaft 42, 48 torque and/or rotation speed, etc. so as to control an engine power or performance of the gas turbine engine 22. In some embodiments, the ECU may be part of a full authority digital engine control (FADEC) system for the propulsion system 20.

The controller 146 may be configured to selectively control the actuation system 66 during operation of the propulsion system 20 to optimally position the splitter band 64 and the variable inlet guide vanes 68 for different operating conditions of the gas turbine engine 22. For example, the memory 150 may include instructions which, when executed by the processor 148, cause the controller 146 to control the actuator 118 to facilitate selective positioning of splitter band 64 and the variable inlet guide vanes 68. For example, during a cruising operational condition or when a greater propulsion system 20 bypass ratio is preferred, the controller 146 may control the actuator 118 to position, through the actuation system 66, the band segments 104 in their retracted positions and pivot the variable inlet guide vanes 68 in the closing direction. In some other propulsion system 20 operating conditions, such as takeoff conditions or other operational conditions when a lower propulsion system 20 bypass ratio is preferred (e.g., high-power operating conditions), the controller 146 may control the actuator 118 to position, through the actuation system 66, the band segments 104 in their extend positions and pivot the variable inlet guide vanes 68 in the opening direction.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A splitter assembly for a gas turbine engine of an aircraft propulsion system, the splitter assembly comprising:

a splitter structure including an inner structure member, an outer structure member, and a splitter housing, the inner structure member, the outer structure member, and the splitter housing extending circumferentially about an engine axis, the outer structure member disposed radially outward of the inner structure member, the splitter housing disposed between the inner structure member and the outer structure member at an upstream end of the splitter structure;

a splitter band including a plurality of band segments, the plurality of band segments arranged circumferentially about the engine axis within the splitter housing, each of the plurality of band segments translatable within the splitter housing between an extended position and a retracted position, the extended position radially outward of the retracted position;

an actuation system including a plurality of first cams disposed within the splitter housing, each of the plurality of first cams contacting at least one of the plurality of band segments, said each of the plurality of first cams pivotable about a respective first pivot axis, the plurality of first cams configured to effect translation of the plurality of band segments between the extended position and the retracted position by pivoting about the first pivot axis; and a plurality of variable inlet guide vanes disposed radially inward of the inner structure member, the plurality of variable inlet guide vanes arranged circumferentially about the engine axis, each of the plurality of variable inlet guide vanes pivotably mounted to and pivotable with a respective one of the plurality of first cams.

2. The splitter assembly of claim 1, wherein said each of the plurality of band segments is translatable within the splitter housing along a translation axis, and the translation axis extends radially outward from the engine axis in a downstream to upstream direction.

3. The splitter assembly of claim 1, wherein the plurality of band segments in the retracted position are disposed within the splitter housing and the plurality of band segments in the extended position are disposed at least partially outside of the splitter housing.

4. The splitter assembly of claim 1, wherein said each of the plurality of variable inlet guide vanes is configured to pivot about the first pivot axis in a closing direction as the plurality of band segments translate from the extended position to the retracted position.

5. The splitter assembly of claim 1, wherein the plurality of band segments form a plurality of circumferential gaps through the splitter band, and each of the circumferential gaps is formed between a circumferentially-adjacent pair of the plurality of band segments.

6. The splitter assembly of claim 1, wherein the actuation system further includes a plurality of second cams, a linkage assembly, and a synchronization ring, each of the plurality of second cams is pivotable about a respective second pivot axis, said each of the plurality of second cams is operably coupled between the synchronization ring and a respective one of the plurality of first cams, and the synchronization ring extends circumferentially about the engine axis.

7. The splitter assembly of claim 6, wherein the actuation system further includes an actuator operably coupled with the synchronization ring, and the actuator is configured to rotate the synchronization ring about the engine axis.

8. The splitter assembly of claim 7, further comprising a controller connected in signal communication with the actuator, the controller including a processor connected in signal communication with a non-transitory memory storing instructions which, when executed by the processor, cause the processor to:

control the actuator, in a first operating condition of the gas turbine engine, to rotate the synchronization ring in a first direction to translate the plurality of band segments to the extended position with the actuation system; and control the actuator, in a second operating condition of the gas turbine engine, to rotate the synchronization ring in a second direction to translate the plurality of band segments to the retracted position with the actuation system.

9. The splitter assembly of claim 1, wherein said each of the plurality of band segments includes an elastically deformable material body.

10. A gas turbine engine for an aircraft propulsion system, the gas turbine engine comprising:

an engine core extending along an engine axis of the gas turbine engine, the engine core including a compressor section, a combustor section, and a turbine section, the engine core forming a core flow path extending through the compressor section, the combustor section, and the turbine section;

a bypass flow path disposed radially outward of the engine core; and a splitter assembly disposed radially between the core flow path and the bypass flow path, the splitter assembly including:

a splitter structure including an inner structure member, an outer structure member, and a splitter housing, the inner structure member, the outer structure member, and the splitter housing extending circumferentially about an engine axis, the inner structure member forming the core flow path, the outer structure member forming the bypass flow path, the splitter housing disposed between the inner structure member and the outer structure member at an upstream end of the splitter structure;

a splitter band including a plurality of band segments, the plurality of band segments arranged circumferentially about the engine axis within the splitter housing, each of the plurality of band segments translatable within the splitter housing between an extended position and a retracted position, the plurality of band segments in the extended position extending a least partially outside of the splitter structure at the upstream end;

a plurality of first cams disposed within the splitter housing, each of the plurality of first cams contacting at least one of the plurality of band segments, said each of the plurality of first cams pivotable about a respective first pivot axis, the plurality of first cams configured to effect translation of the plurality of band segments between the extended position and the retracted position by pivoting about the first pivot axis; and a plurality of variable inlet guide vanes disposed within the core flow path, the plurality of variable inlet guide vanes arranged circumferentially about the engine axis, each of the plurality of variable inlet guide vanes pivotably mounted to and pivotable with a respective one of the plurality of first cams.

11. The gas turbine engine of claim 10, wherein the inner structure member and the outer structure member form a splitter cavity radially between the inner structure member and the outer structure member, and a portion of the splitter housing is disposed within the splitter cavity.

12. The gas turbine engine of claim 11, wherein the plurality of band segments form a plurality of circumferential gaps through the splitter band, and each of the circumferential gaps is formed between a circumferentially-adjacent pair of the plurality of band segments.

13. The gas turbine engine of claim 12, wherein the plurality of circumferential gaps forms an air flow path through the splitter band and the splitter housing to the splitter cavity.

14. The gas turbine engine of claim 13, wherein the splitter assembly further includes an actuation system including the plurality of first cams and further including a plurality of second cams, a linkage assembly, and a synchronization ring, each of the plurality of second cams is pivotable about a respective second pivot axis, said each of the plurality of second cams is operably coupled between the synchronization ring and a respective one of the plurality of first cams, and the synchronization ring extends circumferentially about the engine axis.

15. The gas turbine engine of claim 14, wherein the plurality of second cams are configured to obstruct the air flow path with the plurality of band segments in the retracted position.

16. The gas turbine engine of claim 10, wherein the inner structure member includes a first leading edge, the outer structure member includes a second leading edge, and the upstream end is disposed axially forward of the first leading edge and the second leading edge.

17. The gas turbine engine of claim 10, wherein the plurality of band segments in the extended position are disposed radially outward of and axially upstream of the plurality of band segments in the retracted position.

18. A method for operating a splitter assembly of a gas turbine engine for an aircraft propulsion system, the method comprising:

directing an air flow through a fan section and into a core flow path and a bypass flow path by rotating a bladed fan rotor, directing the air flow into the core flow path including directing the air flow through a plurality of variable inlet guide vanes;

separating the air flow into the core flow path and the bypass flow path with the splitter assembly;

operating the splitter assembly to position a splitter band of the splitter assembly, the splitter band including a plurality of band segments arranged circumferentially about an engine axis of the gas turbine engine, operating the splitter assembly to position the splitter band including translating each of the plurality of band segments along a translation axis between an extended position and a retracted position, the plurality of band segments in the extended position forming a leading edge of the splitter assembly, the plurality of band segments in the retracted position disposed radially inward and axially downstream of the plurality of band segments in the extended position, and controlling each of the plurality of variable guide vanes, with the splitter assembly, to pivot about a pivot axis as said each of the plurality of band segments translates along the translation axis.

19. The method of claim 18, further comprising directing the air flow through the splitter band with the plurality of band segments in the extended position.

20. The method of claim 19, wherein said each of the plurality of variable guide vanes pivots about the pivot axis in a closing direction as the plurality of band segments translate along the translation axis from the extended position to the retracted position.

* * * * *